1

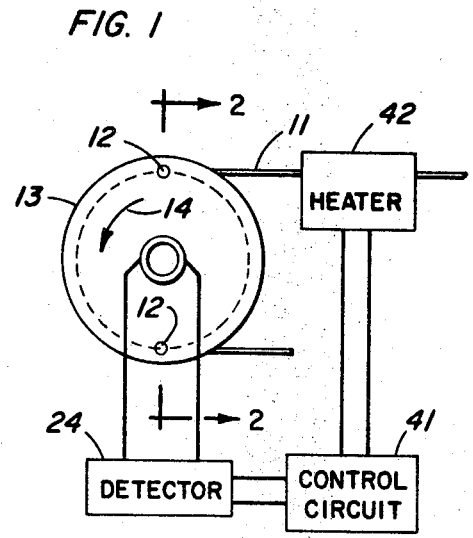
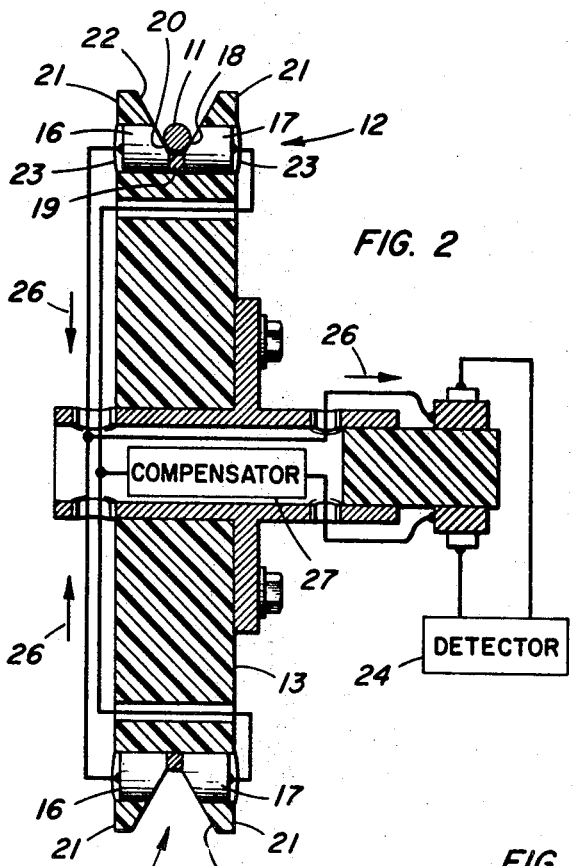
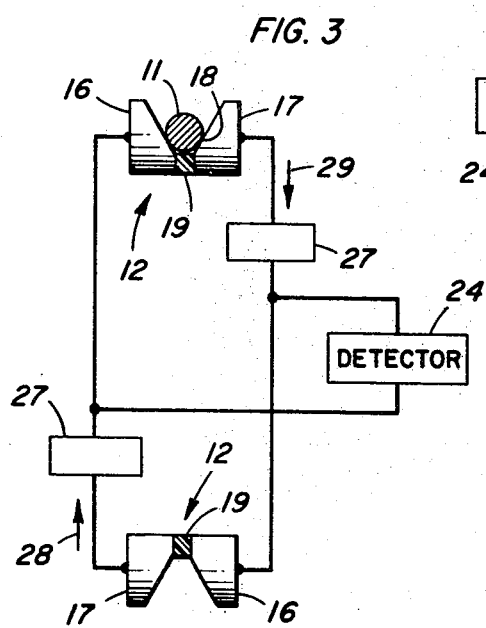
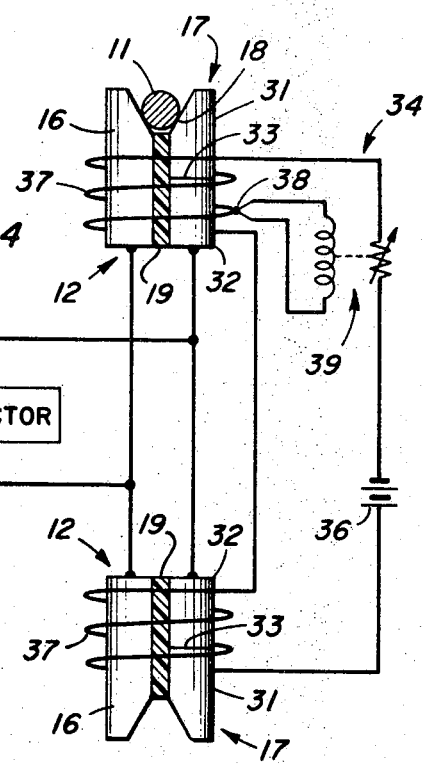
INVENTOR
D. H. PRUDEN
BY W. L. Williamson
ATTORNEY United States Patent Office 3,534,610
Patented Oct. 20, 1970

3,534,610
APPARATUS FOR MEASURING TEMPERATURE
David Herman Pruden, Trenton, N.J., assignor to Western Electric Company, Incorporated, a corporation of New York
Filed June 26, 1968, Ser. No. 740,322
Int. Cl. G01k 7/08, 7/14
U.S. Cl. 73—359   4 Claims

ABSTRACT OF THE DISCLOSURE

A thermocouple element having two sections which are electrically isolated from each other is employed to measure the temperature of an article. The thermocouple element is applied to the article to form a thermocouple junction between the article itself and one of the sections of the thermocouple element. In addition, the article electrically bridges the sections to permit the output of the thermocouple junction to be measured across the sections of the thermocouple element. The output of the thermocouple junction may also be employed to control the temperature of the article.

BACKGROUND OF THE INVENTION

Field of the invention

This invention relates to a method of and apparatus for measuring the temperature of an article and more particularly to a method of and apparatus for measuring the temperature of an article with a thermocouple.

Statement of the problem

The utilization of thermocouples to measure the temperature of an article is well known in the art. However, in order to obtain an accurate temperature measurement, it is necessary for the thermocouple junction of the thermocouple to be at the same temperature as the article. This is commonly accomplished by maintaining the thermocouple in contact with the article so that the conduction of thermal energy between the article and the thermocouple will bring the thermocouple junction to the temperature of the article. However, due to the time interval required for the thermocouple and the article to achieve thermal equilibrium, difficulty is encountered in measuring the temperature of an article particularly when the temperature of the article is not constant. When the temperature of an article is changing or fluctuating, the temperature of the thermocouple may never be the same as the article as the temperature of the article may change more rapidly than thermal equilibrium between the article and the thermocouple junction can be established. As a result, an accurate temperature measurement is not obtained.

In many manufacturing situations, it is necessary to maintain an article at a predetermined temperature or to determine when an article has reached a predetermined temperature. For example, in extruding insolation onto a strand, it is frequently necessary to maintain the strand at a predetermined temperature as it enters an extruder. This may be required to achieve uniform electrical properties of the insulated strand or to achieve uniform mechanical properties such as adhesion of the insulation to the strand. Difficulty is encountered in employing a thermocouple to measure the temperature of the strand as the temperature tends to change and fluctuate. As will be appreciated, in order to maintain an article at a predetermined temperature, it is necessary to accurately measure the temperature of the article.

It is, therefore, an object of this invention to provide a method of and an apparatus for accurately measuring the temperature of an article.

In addition, it is an object of this invention to provide a method of and an apparatus for controlling the temperature of an article.

SUMMARY OF THE INVENTION

With the foregoing objects and others in view, the method of this invention contemplates the steps of (1) applying a first and second section of a thermocouple element to an article to electrically bridge the sections and to form a thermocouple junction between the article and at least one of the sections upon engagement of the article therewith, and (2) detecting the output of the thermocouple junction by measuring the output across the first and second sections of the thermocouple element.

In addition, with the foregoing objects and others in view, the apparatus of this invention contemplates providing facilities (1) for applying a first and second section of a thermocouple element to an article to electrically bridge the sections and to form a thermocouple junction between the article and at least one of the sections upon engagement of the article therewith, and (2) for detecting the output of the thermocouple junction across the first and second sections of the thermocouple element.

BRIEF DESCRIPTION OF THE DRAWINGS

The nature of this invention and its advantages will appear more fully from the following detailed description when taken in conjunction with the appended drawings, in which:

FIG. 1 is a side view of a sheave having two thermocouple elements suitable for measuring the temperature of an article according to the teachings of this invention spaced at 180° intervals about the circumference of the sheave, and also shows a suitable arrangement for controlling the temperature of an article;

FIG. 2 is an enlarged sectional view of FIG. 1 taken along lines 2—2;

FIG. 3 is a diagrammatic view of an alternate embodiment showing two thermocouple elements electrically connected in a parallel opposing relationship; and FIG. 4 is a diagrammatic view of another alternate embodiment showing a suitable arrangement for measuring the temperature of an article.

DETAILED DESCRIPTION

A complete understanding of the invention may be had by reference to FIGS. 1–4 of the appended drawings when taken in conjunction with the following detailed description.

The method of this invention includes the steps of (1) applying a first and a second section of a thermocouple element to an article to form a thermocouple junction between the article and at least one of the sections upon engagement of the article therewith, and (2) detecting the output of the thermocouple junction by measuring said output across the first and second sections of the thermocouple element to measure the temperature of said article. The resulting output may also be employed to control the temperature of the article.

The first and second sections of a thermocouple element may be applied to an article in any desired manner. For example, for an article such as strand 11, a thermocouple element 12 may be mounted in a sheave 13 so that upon rotation of the sheave 13, for example, in the direction of arrow 14 (FIG. 1) in response to displacement of the strand 11 across the sheave, one or more thermocouple elements are rotated into engagement with the strand to apply sections 16 and 17 of a thermocouple element 12 to the strand (FIGS. 2–4).

Each of the thermocouple elements 12—12 are advantageously provided with two separate sections 16 and 17 (FIGS. 2–4). Section 16, for example, may advantageously be made from the same material as the strand 11 while section 17 may advantageously be made from a dissimilar material so that a thermocouple junction 18 is formed between the strand 11 and section 17 when the strand contacts the thermocouple element. For example, if strand 11 is copper, section 16 may be copper and section 17 constantan. The sections 16 and 17 are separated from each other and are insulated from each other, for example, by an insulator 19 such as a mica strip so that a thermocouple circuit is formed only when strand 11 contacts sections 16 and 17 of the thermocouple elements 12—12.

As the strand 11 itself forms the thermocouple junction 18, the junction reaches the temperature of the strand 11 almost instantaneously with the formation of the junction 18 by the strand. In this manner, the output of the thermocouple element 12 in contact with the strand 11 almost instantaneously reaches a level which is directly proportional to the temperature of the strand 11. This permits the measurement of the temperature of the strand 11 even when the strand is traveling at relatively high speeds, for example in excess of 4,000 feet per minute. It should also be noted that as only a small portion of the strand 11 is in the thermocouple circuit, variations in the strand such as a variation in its electrical resistance, diameter, etc., have a minimal effect on the output of the thermocouple element.

It is to be understood, however, that it is not necessary for section 16 of the thermocouple element 12 to be made of the same material as strand 11. For example, the section 16 may be copper and strand 11 and section 17 may be aluminum and constantan, respectively. If the strand 11 is made of a material which is dissimilar from section 16, a thermocouple junction 20 (FIG. 1) is formed by the strand 11 and section 16. This is in addition to the thermocouple junction 18 formed between section 17 and the strand 11. As the strand 11 forms both thermocouple junctions 18 and 20, the thermocouple junctions are always at substantially the same temperature.

As the thermocouple junctions 18 and 20 are at the same temperature, the output of the thermocouple junctions is identical to what the output would be if the strand 11 was of the same material as section 16. This follows from the law of intermediate metals of thermoelectric thermometry. For example, if section 16 is copper, strand 11 is aluminum and section 17 is constantan, a copper-aluminum junction is formed at junction 20 and an aluminum-constantan junction is formed at junction 18. It follows from the law of intermediate metals that the thermocouple junctions 18 and 20 may be considered as a single copper-constantan junction when the junctions 18 and 20 are at the same temperature. This is precisely the type of junction which is formed when section 16 is copper, strand 11 is copper and section 17 is constantan, i.e., when the strand 11 is of the same material as section 16.

As will be appreciated, this permits the measurement of the temperature of a plurality of different strand materials without changing the thermocouple element 12 for each different material. In addition, the temperature of a coated strand such as a tin coated copper wire may be measured and the sections 16 and 17 may be provided with a wear resistant finish such as a chrome coating without interference with the operation of the thermocouple element 12.

If desired, a single thermocouple element 12 may be mounted in the sheave 13 so that the temperature of the strand 11 is only measured when the thermocouple element is rotated into engagement with the strand. Or, if desired, the strand may engage the sheave across substantially the entire circumference of the sheave so that the thermocouple element 12 is maintained in engagement with the strand substantially all of the time. Or, as illustrated in FIG. 1, two thermocouple elements 12—12 may be mounted at spaced intervals of 180° about the circumference of the sheave 13 so that by maintaining the strand 11 in contact with the circumference of the sheave across a 180° arc at least one thermocouple element may be maintained in contact with the strand. In other words, as one thermocouple element is rotated out of engagement with the strand, the other thermocouple element is rotated into engagement with the strand.

As will be appreciated by one skilled in the art, if it is desirable to limit the contact between the strand and the sheave to a smaller portion of the sheave while maintaining a thermocouple element in engagement with the strand at all times, this may be accomplished by increasing the number of thermocouple elements mounted in the sheave. For example, the contact may be limited to approximately a 45° arc of the circumference of the sheave by employing four thermocouple elements spaced at 45° intervals about the circumference of the sheave.

The sheave 13 is advantageously made from an insulating material such as fiberboard so as to reduce the heat loss from the thermocouple elements 12—12 due to conduction and to electrically isolate the thermocouple elements. In addition, by providing the sheave 13 with flanges 21—21 to define a groove 22 and by mounting the thermocouple elements 12—12 at the bottom of the groove 22, heat loss due to convection is also reduced to a minimum. Convection heat losses may be further reduced by potting the thermocouple elements 12—12 in the sheave 13 with a suitable material 23 such as a non-conductive putty.

The output of the thermocouple junction may be measured across the first and second sections of the thermocouple element by including the first and second sections in a conventional detection circuit. When the first and second sections are in engagement with an article, the article bridges the sections to complete the detection circuit and to permit the output of the thermocouple junction to be measured across the first and second sections.

As illustrated in FIGS. 2–4, not only does not the strand 11 form a thermocouple junction 18 when the strand engages sections 16 and 17 but the strand also electrically bridges the sections 16 and 17 together to complete the detection circuit. In other words, as the sections 16 and 17 are electrically insulated one from the other by the sheave 13 and the insulator 19, each thermocouple is removed from the detection circuit when not in engagement with the strand. By measuring the output of the thermocouple junction 18 across the sections 16 and 17, the amount of the strand included in the detection circuit may be reduced to a minimum so as to substantially eliminate the effect of any variations in the strand from the detection circuit such as variations in diameter, electrical resistance, etc. This permits the strand itself to be employed to form the thermocouple junction 18 without introducing variations in the detection circuit due to non-uniformity in the properties of the strand.

As illustrated in FIG. 2, the thermocouple elements 12—12 are advantageously connected to a detector 24 in a parallel aiding relationship. In this manner, the output of each thermocouple element has the same sense, for example, in the direction of arrows 26—26. In this manner, a D.C. signal, the magnitude of which is proportional to the temperature of the strand, is applied to the detector 24. As one thermocouple element is rotated into engagement with the strand when the other thermocouple element is rotated out of engagement with the strand, only one thermocouple element is in the detection circuit at any one time.

As will be appreciated, however, if the thermocouple elements 12—12 are spaced precisely 180° apart and the strand contacts the sheave 13 along precisely a 180° arc of the circumference of the sheave, there will be an instant during which both thermocouples are in engagement with the strand. On the other hand, if the strand contacts the sheave along an arc slightly less than 180°, there will be an instant during which neither thermocouple is in engagement with the strand. This will result in some switching noise in the detection circuit when the thermocouple elements make and break contact with the strand. However, conventional circuit design techniques may be employed to substantially eliminate such noise from the detection circuit.

A compensating element 27 is also advantageously employed to provide a reference thermocouple junction for the thermocouple elements 12—12. For example, a conventional thermocouple reference junction compensator such as Model 325 sold by the Acromag Company may be employed.

Referring now to FIG. 3, an alternate embodiment is illustrated wherein a square wave signal is generated by the thermocouple elements 12—12. In this embodiment the thermocouple elements 12—12 are electrically connected in a parallel opposing relationship so that the output generated by each thermocouple element for a given strand temperature is 180° out of phase relative to each other. In this embodiment, the output of a given thermocouple element 12 is a generally square wave signal which is initiated by the strand 11 making contact with the thermocouple element and which is terminated by the strand 11 breaking contact with the thermocouple element. As the thermocouple elements are electrically connected in a parallel opposing relationship, the output received at detector 24 from one thermocouple element for a given temperature always has a positive direction, for example, the direction of arrow 28, while the signal generated by the other thermocouple element always has a negative direction, for example, the direction of arrow 29. As the outputs of the thermocouple elements are alternatively impressed upon the detector 24, a square wave signal is generated by the thermocouple elements.

The square wave signal has the advantage of permitting the use of A.C. amplifiers for amplifying the output of the thermocouple elements and avoids the instability inherent in D.C. amplifiers. Compensating elements 27—27 may also be advantageously employed to provide a reference temperature for the thermocouple elements. In this embodiment, detector 24 is advantageously a synchronous detector so that the output of the detector is a D.C. signal, the magnitude of which is indicative of the temperature of the strand 11.

Referring now to FIG. 4, section 17 of thermocouple elements 12—12 is a composite section having two portions 31 and 32 which form a thermocouple junction 33. For example, when section 16 is copper and the strand 11 is copper, thermocouple junction 33 may advantageously be formed by friction welding portion 31 such as a copper rod to portion 32 such as a constantan rod. By employing a heating circuit 34 to maintain thermocouple junction 33 at the desired temperature for strand 11, the thermocouple element 12 will generate an output only when the strand 11 is not at the temperature of the thermocouple junction 33. In effect, the thermocouple junction 33 functions as a reference junction and obviates the need for a compensating element 27.

Any conventional heating circuit may be employed to maintain the thermocouple junctions 33—33 at a desired temperature. For example, a suitable power source 36 may be employed to operate resistance heaters 37—37 to heat the thermocouple junctions 33—33 to a desired temperature. A thermocouple junction 38 may be employed to sense the temperature of the thermocouple junctions 33—33 and to control the temperature of the thermocouple junctions by employing a solenoid controlled variable resistance 39 to adjust the temperature of the resistance heaters 37—37.

If the temperature of thermocouple junction 18 is less than the temperature of thermocouple junction 33, the output of thermocouple element 12 will have one direction or sense whereas if the temperature of thermocouple junction 18 is greater than the temperature of thermocouple junction 33, the output of thermocouple element 12 will have the opposite direction or sense. As the thermocouple elements 12—12 are electrically connected in a parallel aiding relationship, the sense of the resulting D.C. signal is indicative of whether the strand 11 is below or above the desired temperature and the magnitude of the signal is indicative of the amount of variation from the desired temperature. In this manner, an error signal is generated which is highly suitable for use by a conventional control circuit 41 (FIG. 1) to control a strand heating device 42 (FIG. 1) such as a strand annealed so as to control the temperature of stand 11.

As will be appreciated by one skilled in the art, many modifications and changes may be made without departing from the spirit of the invention.

What is claimed is:

1. A device for measuring the temperature of an advancing strand, comprising:
   at least two thermocouple elements, said thermocouple elements being electrically connected in parallel, each of said thermocouple elements having a first section of one material and a second section of another material which are electrically isolated from each other, the sections of successive thermocouple elements which are of different material being connected together;
   means for sequentially advancing said strand into rolling contact with each of said thermocouple elements to electrically bridge said first and second sections of said thermocouple elements to form a thermocouple junction between said strand and at least one of said sections upon engagement of said strand therewith; and
   means for sequentially detecting any output from each of said thermocouple elements as said strand contacts said thermocouple elements by measuring said output across said first and second sections of said thermocouple elements to measure the temperature of said strand.

2. A device for measuring the temperature of an advancing strand, comprising:
   a sheave;
   at least two thermocouple elements carried by said sheave, said thermocouple elements being electrically connected in parallel, each of said thermocouple elements having a first section of one material and a second section of another material which are electrically isolated from each other, the sections of successive thermocouple elements which are of different material being connected together;
   means for advancing said strand across said sheave in rolling contact therewith so as to sequentially engage each of said thermocouple elements, said strand electrically bridging said first and second sections forming a thermocouple junction between said strand and at least one of said sections upon engagement of said strand with any one of said thermocouple elements; and
   means for detecting any output from said thermocouple elements by measuring said output across said first and second sections of said thermocouple elements to measure the temperature of said strand.

3. A device for measuring the temperature of an advancing strand comprising:
   a sheave;
   a plurality of thermocouple elements carried by said sheave in an equally spaced relationship about the circumference thereof, said thermocouple elements being electrically connected in parallel, each of said thermocouple elements having a first section of one material and a second section of another material which are electrically isolated from each other, the sections of successive thermocouple elements which are of different material being connected together;

means for advancing said strand across said sheave so that said sheave rotates with the strand to bring only one thermocouple element into contact with said strand at any one time, said strand electrically bridging said sections and forming a thermocouple junction between said strand and at least one of said sections upon engagement and said strand with any one of said thermocouple elements; and means for detecting any output from the thermocouple element in engagement with said strand by measuring said output across said sections to measure the temperature of said strand.

4. A device for measuring the temperature of an article, comprising:

a first section of a thermocouple element;

a second section of a thermocouple element having a first and a second portion, said first portion being made of a material dissimilar from said second portion and said second portion being made of the same material as said first section, said first and second portions of said second section forming a first thermocouple junction and said first and second sections being electrically isolated from each other;

means for applying said first section and said first portion of said second section to said article to electrically bridge said first and second sections and to form at least one additional thermocouple junction between said article and said sections;

means for maintaining said first junction at a predetermined temperature so that said thermocouple element generates an output only when said article is at a different temperature than said first junction, the sense of said output indicating whether said article is above or below the temperature of said first junction and the magnitude of said output indicating the amount of variation of the temperature of the article from the temperature of said first junction; and means for detecting the output across said first and second sections to detect the sense and magnitude of said output so as to measure the temperature of said article.

References Cited

UNITED STATES PATENTS

| | | | |
|---|---|---|---|
| 2,694,313 | 11/1954 | Nieman | 73—351 |
| 3,246,519 | 4/1966 | Dornberger | 73—341 |
| 3,398,580 | 8/1968 | Nyman | 73—359 |
| 3,407,097 | 10/1968 | Engelhard | 136—221 |

LOUIS R. PRINCE, Primary Examiner

D. E. CORR, Assistant Examiner

U.S. Cl. X.R.

73—351

PO-1050
(5/69)

UNITED STATES PATENT OFFICE
CERTIFICATE OF CORRECTION

Patent No. 3,534,610           Dated 10/20/70

Inventor(s) D. H. Pruden

It is certified that error appears in the above-identified patent and that said Letters Patent are hereby corrected as shown below:

In the specification, Column 1, line 60, "insolation" should read --insulation--. Column 3, line 25, "example in" should read --example, in--. Column 4, line 42, "does not the" should read --does the--. Column 6, lines 14-15, "annealed" should read --annealer--.

In the claims, claim 2, column 6, lines 57-58, "sections forming" should read --sections and forming--. Claim 3, column 7, line 7, "engagement and said" should read --engagement of said--.

SIGNED AND
SEALED
DEC 22 1970

(SEAL)
Attest:

Edward M. Fletcher, Jr.
Attesting Officer

WILLIAM E. SCHUYLER, JR.
Commissioner of Patents